US012600353B2

(12) United States Patent　　(10) Patent No.: US 12,600,353 B2

Nagae　　(45) Date of Patent: Apr. 14, 2026

(54) LANE DEPARTURE SUPPRESSION DEVICE AND LANE DEPARTURE SUPPRESSION METHOD

(71) Applicant: TOYOTA JIDOSHA KABUSHIKI KAISHA, Toyota (JP)

(72) Inventor: Hajime Nagae, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 22 days.

(21) Appl. No.: 18/968,596

(22) Filed: Dec. 4, 2024

(65) Prior Publication Data

US 2025/0229777 A1　　Jul. 17, 2025

(30) Foreign Application Priority Data

Jan. 16, 2024　(JP) ................................. 2024-004273

(51) Int. Cl.
*B60W 30/12*　　(2020.01)

(52) U.S. Cl.
CPC ....... *B60W 30/12* (2013.01); *B60W 2420/403* (2013.01); *B60W 2420/408* (2024.01); *B60W 2552/53* (2020.02); *B60W 2720/14* (2013.01)

(58) Field of Classification Search
CPC .......... B60K 28/00–165; B60W 30/12; B60W 2420/403; B60W 2420/408; B60W 2552/00; B60W 2552/05; B60W 2552/53; B60W 2720/14; G05D 1/0061; G05D 1/0088; G05D 1/021; G05D 1/0214; G05D 1/0221; G05D 1/0223
See application file for complete search history.

(56) References Cited

U.S. PATENT DOCUMENTS

| | | | |
|---|---|---|---|
| 11,036,235 B2 * | 6/2021 | Ishikawa .............. G05D 1/0088 |
| 2017/0313309 A1 | 11/2017 | Morales Teraoka | |
| 2020/0023899 A1 | 1/2020 | Takahashi et al. | |
| 2023/0135893 A1 | 5/2023 | Fujita | |

FOREIGN PATENT DOCUMENTS

| | | |
|---|---|---|
| JP | 2017197020 A | 11/2017 |
| JP | 2020011562 A | 1/2020 |
| JP | 2023065900 A | 5/2023 |

* cited by examiner

*Primary Examiner* — Mark L. Greene

(74) *Attorney, Agent, or Firm* — Hunton Andrews Kurth LLP

(57) ABSTRACT

A lane departure suppression device includes a driving assistance ECU configured to, when determination is made that there is a risk that a vehicle departs from a lane based on information acquired by a target information acquisition device that acquires information about a target around a host vehicle, execute yaw moment application control of applying a yaw moment for suppressing the departure of the vehicle from the lane to the vehicle. The driving assistance ECU is configured to, when determination is made that the vehicle travels on a road without a center line and that there is a risk that the vehicle departs from the lane in an off-road direction, reduce the yaw moment as compared with when determination is made that the vehicle travels on a road with a center line and that there is a risk that the vehicle departs from the lane in the off-road direction.

5 Claims, 4 Drawing Sheets

LANE DEPARTURE SUPPRESSION DEVICE AND LANE DEPARTURE SUPPRESSION METHOD

CROSS-REFERENCE TO RELATED APPLICATION

This application claims priority to Japanese Patent Application No. 2024-004273 filed on Jan. 16, 2024. The disclosure of the above-identified application, including the specification, drawings, and claims, is incorporated by reference herein in its entirety.

BACKGROUND

1. Technical Field

The present disclosure relates to a lane departure suppression device and a lane departure suppression method for a vehicle, such as an automobile.

2. Description of Related Art

As one of driving assistance devices for automobiles, a lane departure suppression device is known that, when a determination is made that there is a risk that a vehicle departs from a lane, applies a yaw moment for suppressing the departure of the vehicle from the lane.

For example, Japanese Unexamined Patent Application Publication No. 2017-197020 (JP 2017-197020 A) describes a lane departure suppression device configured to apply a yaw moment to a vehicle when a speed at which the vehicle approaches a lane boundary is low, and apply the yaw moment to the vehicle and brake the vehicle when the speed at which the vehicle approaches the lane boundary is high. With the lane departure suppression device described in JP 2017-197020 A, a risk that a driver feels insecure or inconvenient can be reduced as compared with a case where an aspect of control of returning the vehicle to a center of the lane is not changed in accordance with the speed at which the vehicle approaches the lane boundary.

SUMMARY

In a case where a vehicle travels on a narrow road without a center line, when the same yaw moment is applied as in a case where the vehicle travels on a road with the center line, there is a risk that a driver feels that control of returning the vehicle to a center of a lane is excessive and feels insecure or inconvenient.

The present disclosure provides a lane departure suppression device and a lane departure suppression method that are improved such that, when there is a risk that a vehicle departs from a lane, the departure of the vehicle from the lane is suppressed and a risk that a driver feels insecure or inconvenient is further reduced.

An aspect of the present disclosure provides a lane departure suppression device (100) including: a target information acquisition device (18) configured to acquire information about a target in a vicinity of a vehicle (102); and a control unit (driving assistance ECU 10) configured to, when a determination is made that there is a risk that the vehicle departs from a lane based on the information about the target acquired by the target information acquisition device (S10), execute yaw moment application control of applying a yaw moment (My) for suppressing the departure of the vehicle from the lane to the vehicle (S50).

The control unit (driving assistance ECU 10) is configured to, when a determination is made that the vehicle travels on a road without a center line and that there is a risk that the vehicle departs from the lane in an off-road direction (S10 to S30), reduce the yaw moment as compared with when a determination is made that the vehicle travels on a road with a center line and that there is a risk that the vehicle departs from the lane in the off-road direction (S70).

Another aspect of the present disclosure provides a lane departure suppression method including: determining (S10) whether or not there is a risk that a vehicle (102) departs from a lane based on information about a target in a vicinity of the vehicle, the information being acquired by a target information acquisition device (18); and executing (S50), when a determination is made that there is a risk that the vehicle departs from the lane, yaw moment application control of applying a yaw moment for suppressing the departure of the vehicle from the lane to the vehicle.

The lane departure suppression method further includes determining (S20, S30) whether or not the vehicle is traveling on a road without a center line; and reducing (S70), when a determination is made that the vehicle travels on the road without the center line and that there is a risk that the vehicle departs from the lane in an off-road direction, the yaw moment as compared with when a determination is made that the vehicle travels on a road with a center line and that there is a risk that the vehicle departs from the lane in the off-road direction.

With the lane departure suppression device and the lane departure suppression method, when a determination is made that the vehicle travels on the road without the center line and that there is a risk that the vehicle departs from the lane in the off-road direction, the yaw moment for suppressing the departure of the vehicle from the lane is reduced as compared with when a determination is made that the vehicle travels on the road with the center line and that there is a risk that the vehicle departs from the lane in the off-road direction.

Therefore, the yaw moment to be applied to the vehicle is reduced, and thus a risk that the driver feels that control of turning the vehicle in a direction opposite toward a direction of the departure from the lane is excessive and feels insecure or inconvenient can be reduced as compared with a case where the yaw moment is not reduced. Even in a case where a determination is made that the vehicle travels on the road without the center line and that there is a risk that the vehicle departs from the lane in the off-road direction, the reduced yaw moment is applied to the vehicle, and thus a risk that the vehicle departs from the lane can be reduced as compared with when the yaw moment is not applied.

In the aspect of the present disclosure, the control unit (driving assistance ECU 10) may be configured to, when a determination is made that the target information acquisition device (18) acquires solely information about a lane marking (white line 112) on a side having a risk of the departure of the vehicle as lane markings of the road within a predetermined range from the vehicle (S20), determine that the road is the road without the center line (S70).

According to the aspect, when a determination is made that solely the information about the lane marking on the side having a risk of the departure of the vehicle is acquired as the lane markings of the road within the predetermined range from the vehicle, a determination is made that the road is the road without the center line. Therefore, in a situation where solely the information about the lane marking on the side having a risk of the departure of the vehicle is acquired, the yaw moment to be applied to the vehicle is reduced.

Therefore, a risk that the driver feels that control of turning the vehicle in a direction opposite toward a direction in which the vehicle departs from the lane is excessive and feels insecure or inconvenient can be reduced.

In the aspect of the present disclosure, the control unit (driving assistance ECU 10) may be configured to, when a determination is made that the target information acquisition device (18) acquires information about lane markings on both sides of the vehicle as lane markings of the road within a predetermined range from the vehicle and that an interval between the lane markings on both sides is equal to or greater than a reference interval (S20, S30), determine that the road is the road without the center line (S70).

In general, since a width of the lane is within a predetermined width range, in a case where the information about the lane markings on both sides of the vehicle is acquired, when an interval between the lane markings on both sides is equal to or greater than a reference interval, the road is considered to be a road with a width exceeding a predetermined width range and without the center line.

According to the aspect, when a determination is made that the information about the lane markings on both sides of the vehicle is acquired as the lane markings of the road within the predetermined range from the vehicle and that the interval between the lane markings on both sides is equal to or greater than the reference interval, the road is determined to be the road without the center line. Therefore, when the road is the road without the center line, a determination thereof can be made.

Further, in the aspect of the present disclosure, the control unit (driving assistance ECU 10) may be configured to, after a predetermined time has elapsed from start of the yaw moment application control (S72), gradually reduce the yaw moment to be applied to the vehicle (S74).

According to the aspect, the yaw moment to be applied to the vehicle is not reduced until the predetermined time elapses after the start of the yaw moment application control, and the yaw moment to be applied to the vehicle is gradually reduced after the predetermined time has elapsed from the start of the yaw moment application control. Therefore, until the predetermined time elapses, the departure of the vehicle from the lane can be effectively suppressed. In addition, after the predetermined time has elapsed, the yaw moment is gradually reduced, and a risk that the driver feels that control of turning the vehicle toward a direction opposite to a direction of the departure from the lane is excessive and feels insecure or inconvenient can be reduced.

In the present application, the term "lane" means a traveling region in which the vehicle can travel, and is a region between a white line that defines the traveling region and a boundary of the road. The term "off-road" means a non-traveling region side with respect to a boundary between the traveling region in which the vehicle can travel and a non-traveling region in which the vehicle cannot travel. The phrase "depart in an off-road direction" means that a preset reference position of the vehicle moves from the traveling region to the non-traveling region.

In the above description, in order to assist in understanding of the present disclosure, the names and/or the reference numerals used in the following embodiment are described in parentheses to the configurations of the present disclosure corresponding to the following embodiment. However, each component of the present disclosure is not limited to the component of the embodiment corresponding to the name and/or the numeral described in parentheses. Other objects, other features, and accompanying advantages of the present disclosure will be easily understood from the description of the embodiment of the present disclosure described below with reference to the drawings.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a lane departure suppression device and a lane departure suppression method for a vehicle, which are according to an embodiment of the present disclosure, will be described in detail with reference to the accompanying drawings.

Figure 1:
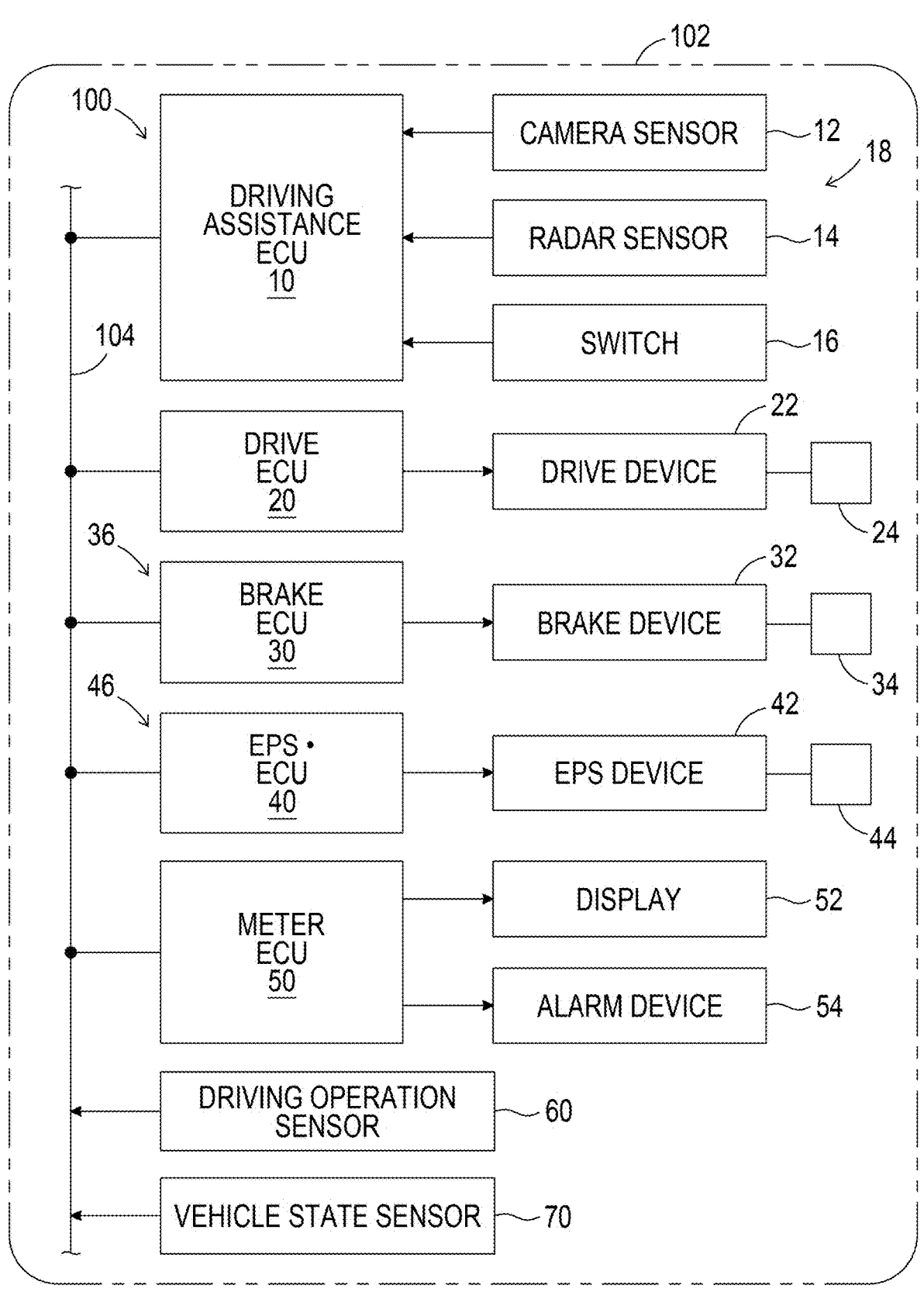
FIG. 1 is a schematic configuration diagram showing a lane departure suppression device according to an embodiment.

As shown in FIG. 1, a lane departure suppression device 100 according to the embodiment of the present disclosure is applied to a vehicle 102, and includes a driving assistance ECU 10. The vehicle 102 is an autonomous vehicle, and includes a drive ECU 20, a brake ECU 30, an electric power steering ECU 40, and a meter ECU 50. The ECU means an electronic control unit (ECU) including a microcomputer as a main part. In the following description, the vehicle 102 will be referred to as a host vehicle as needed in order to distinguish the vehicle 102 from another vehicle. The electric power steering will be referred to as an EPS.

The microcomputer of each ECU includes a CPU, a ROM, a RAM, a readable/writable non-volatile memory (N/M), an interface (I/F), and the like. The CPU executes instructions (programs or routines) stored in the ROM, to realize various functions. Further, these ECUs are connected to each other such that data can be exchanged (communication is possible) via a controller area network (CAN) 104. Therefore, a detection value of a sensor (including a switch) connected to a specific ECU and the like is also transmitted to the other ECU.

The driving assistance ECU 10 is a central control device that executes traveling control of driving assistance, such as lane departure suppression control and inter-vehicle distance control. In the embodiment, the driving assistance ECU 10 executes the lane departure suppression control in cooperation with the other ECU, as will be described in detail below. In the embodiment, as will be described in detail below, yaw moment application control is executed as a part of the lane departure suppression control.

A camera sensor 12, a radar sensor 14, and a switch 16 are connected to the driving assistance ECU 10. The camera sensor 12 and the radar sensor 14 include a plurality of camera devices and a plurality of radar devices, respectively. The camera sensor 12 and the radar sensor 14 function as a target information acquisition device 18 that acquires information about a target in the vicinity of the vehicle 102.

Each of the camera devices of the camera sensor 12 includes a camera unit that images the periphery of the vehicle 102 and a recognition unit that analyzes image data obtained by the imaging using the camera unit to recognize a white line on the road, a target, such as another vehicle. The recognition unit supplies the information about the recognized target to the driving assistance ECU 10 at predetermined time intervals.

Each of the radar devices of the radar sensor 14 includes a radar transceiver and a signal processing unit (not shown). The radar transceiver emits a radio wave (hereinafter, referred to as "millimeter wave") in a millimeter wave band, and receives the millimeter wave (that is, a reflected wave) reflected by a three-dimensional object (for example, another vehicle or a bicycle) existing in an emission range. The signal processing unit supplies information indicating a distance between the host vehicle and the three-dimensional object, a relative speed between the host vehicle and the three-dimensional object, a relative position (direction) of the three-dimensional object with respect to the host vehicle, and the like to the driving assistance ECU 10 at predetermined time intervals based on a phase difference between the transmitted millimeter wave and the received reflected wave, an attenuation level of the reflected wave, a time from the transmission of the millimeter wave to the reception of the reflected wave, and the like. A light detection and ranging (LiDAR) may be used instead of the radar sensor 14 or in addition to the radar sensor 14.

The switch 16 is provided at a position operable by a driver, such as at a steering wheel not shown in FIG. 1, and is operated by the driver. As will be described in detail below, the driving assistance ECU 10 executes the lane departure suppression control when the switch 16 is turned on.

The drive ECU 20 is connected to a drive device 22 that accelerates the vehicle 102 by applying a drive force to drive wheels 24. The drive ECU 20 controls, in a normal case, the drive device 22 such that the drive force generated by the drive device 22 is changed in accordance with a drive operation by the driver, and controls, when a command signal is received from the driving assistance ECU 10, the drive device 22 based on the command signal.

A brake device 32 that applies a brake force to wheels 34 to decelerate the vehicle 102 by braking is connected to the brake ECU 30. The brake ECU 30 controls, in a normal case, the brake device 32 such that the brake force generated by the brake device 32 is changed in accordance with a brake operation by the driver, and controls, when a command signal is received from the driving assistance ECU 10, controls the brake device 32 based on the command signal to execute automatic braking.

Therefore, the brake ECU 30 and the brake device 32 function as an automatic brake device 36 in cooperation with each other, and can control the brake force of the entire vehicle 102 and can control the brake force of each wheel individually. When the brake force is applied to the wheels by the lane departure suppression control or the like, a brake lamp not shown in FIG. 1 is turned on.

An EPS device 42 is connected to the EPS ECU 40. The EPS ECU 40 controls a steering assist torque by controlling the EPS device 42 in a manner known in the technical field based on a steering torque Ts and a vehicle speed V detected by a driving operation sensor 60 and a vehicle state sensor 70, which are described below, and reduces a steering burden on the driver. The EPS ECU 40 can turn steered wheels 44 as needed by controlling the EPS device 42. Therefore, the EPS ECU 40 and the EPS device 42 function as an automatic steering device 46 that automatically steers the steered wheels as needed.

A touch panel type display 52 that displays a situation of the control via the driving assistance ECU 10 and the like and an alarm device 54 that issues an alarm are connected to the meter ECU 50. The display 52 may be, for example, a multi-information display in which meters and various types of information are displayed, or may be a display of a navigation device. The display 52 may display a situation of the lane departure suppression control when the display 52 receives the signal from the driving assistance ECU 10.

The alarm device 54 is operated when a determination is made that there is a risk that the vehicle 102 departs from the lane, and issues an alarm as one of the lane departure suppression controls, that is, issues an alarm that there is a risk that the vehicle 102 departs from the lane. The alarm device 54 may be any of an alarm device that issues a visual alarm, such as an alarm lamp, an alarm device that issues an auditory alarm, such as an alarm buzzer, and an alarm device that issues a bodily alarm, such as vibration of a seat, or may be any combination thereof.

The driving operation sensor 60 and the vehicle state sensor 70 are also connected to the CAN 104. Information (referred to as sensor information) detected by the driving operation sensor 60 and the vehicle state sensor 70 is transmitted to the CAN 104. The sensor information transmitted to the CAN 104 can be appropriately used in each ECU. The sensor information may be information of the sensor connected to a specific ECU, and may be transmitted from the specific ECU to the CAN 104.

The driving operation sensor 60 includes a drive operation amount sensor that detects an operation amount of an accelerator pedal, a brake operation amount sensor that detects a master cylinder pressure or a depression force applied to a brake pedal, and a brake switch that detects whether or not the brake pedal is operated. The driving operation sensor 60 includes a steering angle sensor that detects a steering angle θ, a steering torque sensor that detects a steering torque, a blinker switch that indicates the presence or absence of an operation of a blinker lever and a direction of the operation, and the like. The steering angle θ is a positive value when the vehicle makes a left turn.

The vehicle state sensor 70 includes a vehicle speed sensor that detects the vehicle speed V of the vehicle 102, a longitudinal acceleration sensor that detects longitudinal acceleration of the vehicle, a lateral acceleration sensor that detects lateral acceleration of the vehicle, a yaw rate sensor that detects a yaw rate of the vehicle.

Figure 2:
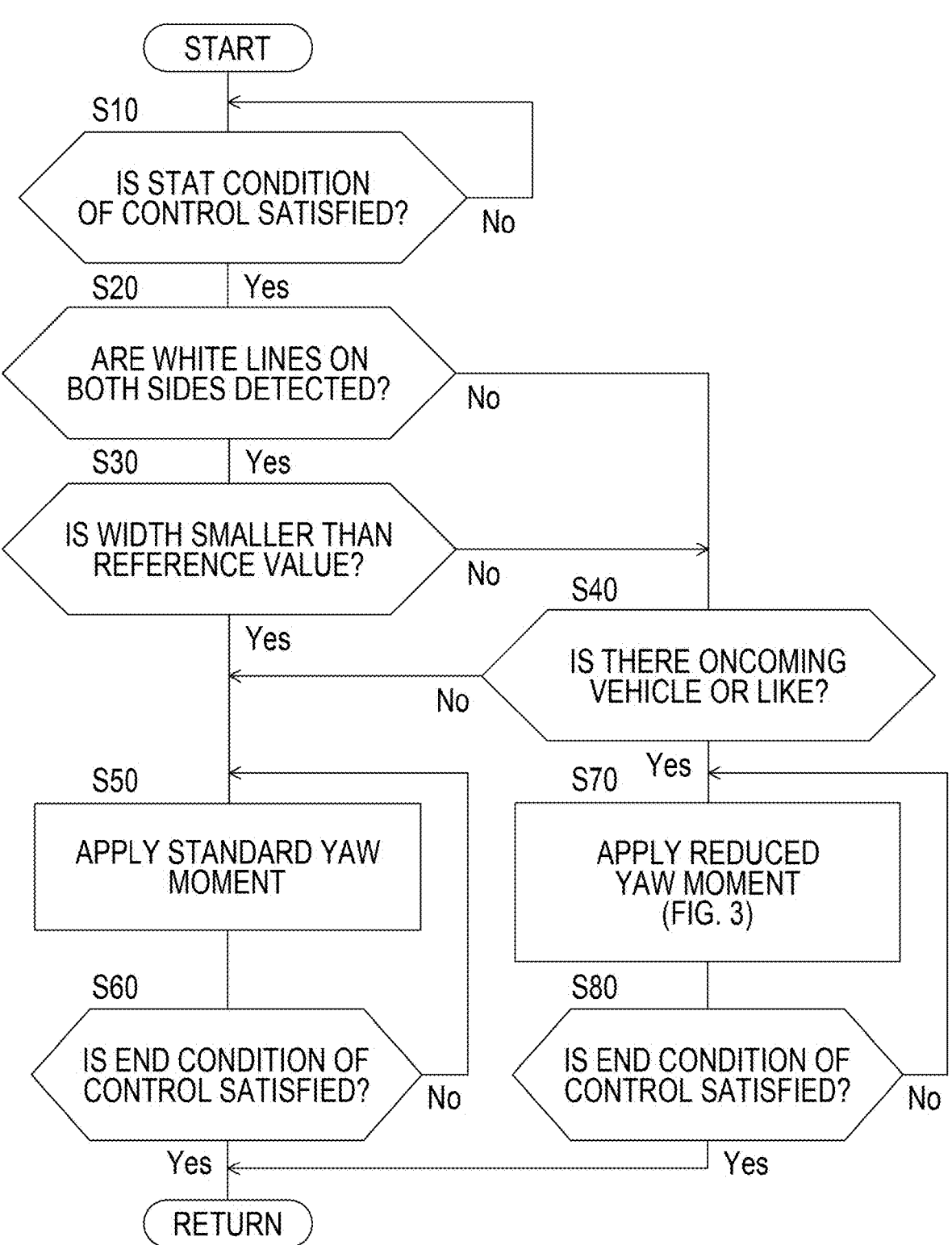
FIG. 2 is a flowchart corresponding to a lane departure suppression program according to the embodiment.
Figure 3:
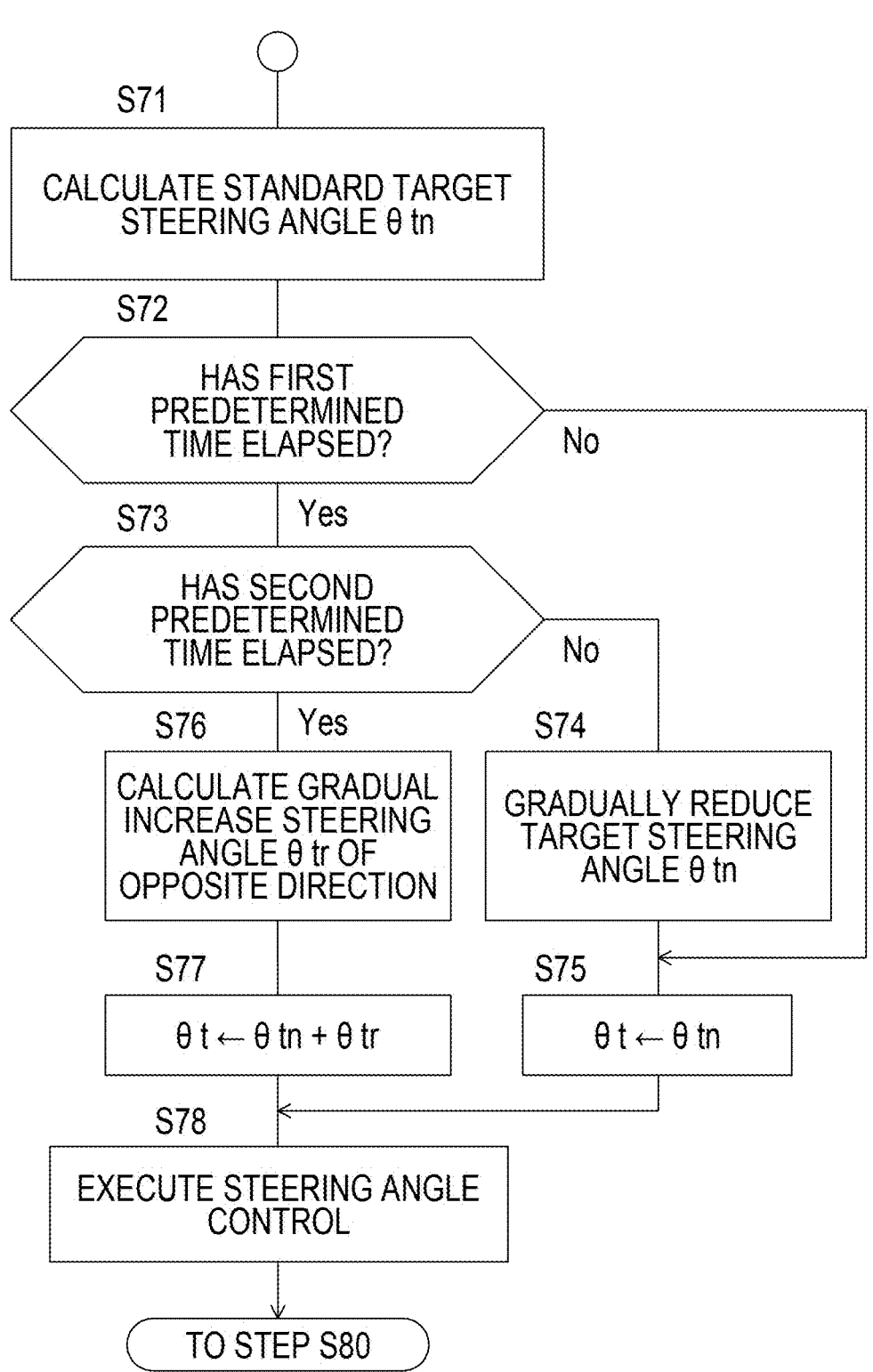
FIG. 3 is a flowchart showing a subroutine of reduced yaw moment application control executed in step S70 of FIG. 2.

In the embodiment, the ROM of the driving assistance ECU 10 stores a lane departure suppression control program corresponding to flowcharts shown in FIGS. 2 and 3. A lane departure suppression method according to the embodiment is executed by executing the lane departure suppression control in accordance with the flowchart shown in FIG. 2. Lane Departure Suppression Control (FIG. 2)

Next, the lane departure suppression control according to the embodiment will be described with reference to the flowchart shown in FIG. 2. The lane departure suppression control in accordance with the flowchart shown in FIG. 2 is repeatedly executed by the CPU of the driving assistance ECU 10 at predetermined time intervals in a situation where the switch 16 is turned on. In the following description, the lane departure suppression control will be referred to as "the present control".

First, in step S10, the CPU determines whether or not the vehicle 102 is likely to depart from the lane and a start condition of the yaw moment application control is satisfied based on the information about the target acquired by the target information acquisition device 18 and the like. When a negative determination is made, the present control temporarily ends, and when an affirmative determination is made, the present control proceeds to step S20. The start condition of the yaw moment application control may be a start condition known in the technical field, such as a start condition described in Japanese Unexamined Patent Application Publication No. 2023-65900 (JP 2023-65900 A) and Japanese Unexamined Patent Application Publication No. 2020-11562 (JP 2020-11562 A).

In step S20, the CPU determines whether or not white lines on both sides of the vehicle are detected as lane markings within a predetermined range from the vehicle 102 based on the information about the target acquired by the target information acquisition device 18. When a negative determination is made, the present control proceeds to step S40, and when an affirmative determination is made, the present control proceeds to step S30. Even when solely a white line on a left side of the vehicle is detected, a negative determination is made.

In step S30, the CPU determines whether or not an interval between the white lines on both sides of the vehicle 102 is smaller than a reference interval, that is, whether or not a width of the lane is smaller than a reference value of the width. The reference value may be a positive constant, such as 4.5 m, which is a maximum lane width in which a plurality of vehicles does not travel side by side. When an affirmative determination is made, the present control proceeds to step S50, and when a negative determination is made, the present control proceeds to step S40.

In step S40, the CPU determines whether or not there is an oncoming vehicle that travels on an adjacent lane and approaches the vehicle 102 or another vehicle that travels on the host vehicle lane as the vehicle 102 and tries to overtake the vehicle 102. When an affirmative determination is made, the present control proceeds to step S70, and when a negative determination is made, the present control proceeds to step S50.

In step S50, the CPU executes standard yaw moment application control of applying a standard yaw moment Myn for suppressing the departure of the vehicle 102 from the lane to the vehicle. For example, in accordance with a risk that the vehicle 102 departs from the lane, the CPU calculates a standard target steering angle θtn needed to reduce the risk. Further, the CPU outputs the command signal to the EPS ECU 40, thereby controlling the automatic steering device 46 to steer the steered wheels 44 such that the steering angle θ becomes the standard target steering angle θtn, and applying the standard yaw moment Myn to the vehicle.

In step S60, the CPU determines whether or not there is no longer a risk that the vehicle 102 departs from the lane and an end condition of the standard yaw moment application control is satisfied based on the information about the target acquired by the target information acquisition device 18 and the like. When a negative determination is made, the present control returns to step S50, and when an affirmative determination is made, the standard yaw moment application control ends, and the present control temporarily ends.

The end condition of the yaw moment application control may be an end condition known in the technical field, such as an end condition described in JP 2023-65900 A and JP 2020-11562 A.

In step S70, the CPU executes the reduced yaw moment application control of applying a reduced yaw moment for suppressing the departure of the vehicle 102 from the lane to the vehicle, in accordance with a subroutine shown in FIG. 3.

In step S80, the CPU determines whether or not an end condition of the reduced yaw moment application control is satisfied based on the information about the target acquired by the target information acquisition device 18 and the like. When a negative determination is made, the present control returns to step S70, and when an affirmative determination is made, the reduced yaw moment application control ends, and the present control temporarily ends. The end condition of the reduced yaw moment application control may be an end condition in which the application of the yaw moment is continued for a longer period of time than in the standard yaw moment application control. Further, the end condition of the reduced yaw moment application control may include that an absolute value of a yaw angle of the vehicle is equal to or smaller than a determination reference value (positive constant) to confirm that a traveling direction of the vehicle is substantially a direction along the lane.

Reduced Yaw Moment Application Control (FIG. 3)

Next, the reduced yaw moment application control in step S70 will be described with reference to FIG. 3.

In step S71, in accordance with a risk that the vehicle 102 departs from the lane, the CPU calculates the standard target steering angle θtn needed to reduce the risk, in a manner known in the technical field.

In step S72, the CPU determines whether or not a first predetermined time has elapsed from the start of the application of the standard yaw moment Myn to the vehicle 102 by controlling the steering angle θ in step S78 described below. When a negative determination is made, the present control proceeds to step S75, and when an affirmative determination is made, the present control proceeds to step S73. The first predetermined time may be a constant time, or may be a time until a risk that the vehicle 102 departs from the lane is reduced to a yaw moment reduction start reference value set in advance.

In step S73, the CPU determines whether or not a second predetermined time that is longer than the first predetermined time has elapsed from the start of the application of the standard yaw moment Myn to the vehicle 102 by controlling the steering angle θ in step S78 described below. When an affirmative determination is made, the present control proceeds to step S76, and when a negative determination is made, the present control proceeds to step S74. The second predetermined time may be a constant time, or may be a time until a risk that the vehicle 102 departs from the lane is further reduced from the yaw moment reduction start reference value.

In step S74, the CPU executes reduction correction of the standard target steering angle θtn such that the magnitude of the standard target steering angle θtn is reduced. The reduction correction of the standard target steering angle θtn may be achieved by multiplying the standard target steering angle θtn by a positive correction coefficient smaller than 1 or subtracting a positive correction reduction amount from the standard target steering angle θtn.

In step S75, the CPU sets the target steering angle θt to the standard target steering angle θtn.

In step S76, the CPU calculates a gradual increase steering angle θtr in which a positive/negative sign is opposite to a positive/negative sign of the standard target steering angle θtn and the magnitude is gradually increased.

In step S77, the CPU sets the target steering angle θt to a sum θtn+θtr of the standard target steering angle θtn and the gradual increase steering angle θtr.

In step S78, the CPU outputs the command signal to the EPS ECU 40, thereby controlling the automatic steering device 46 such that the steering angle θt becomes the target steering angle θt, and applying the yaw moment My to the vehicle. The yaw moment My is the same as the standard yaw moment Myn applied in step S50 until the first predetermined time elapses, and is gradually reduced as compared with the standard yaw moment until the second predetermined time elapses after the first predetermined time has elapsed. Further, the yaw moment My is a sum of the standard yaw moment Myn that is gradually reduced and a yaw moment Myr that is gradually increased in a direction opposite to the standard yaw moment, after the second predetermined time has elapsed.

Therefore, after the second predetermined time has elapsed from the start of the yaw moment application control, the yaw moment Myr in the direction opposite to the standard yaw moment Myn is gradually increased, so that the yaw angle of the vehicle to the lane is gradually reduced, and the vehicle gradually approaches a situation where the vehicle travels along the lane.

Operation of Embodiment

Figure 4:
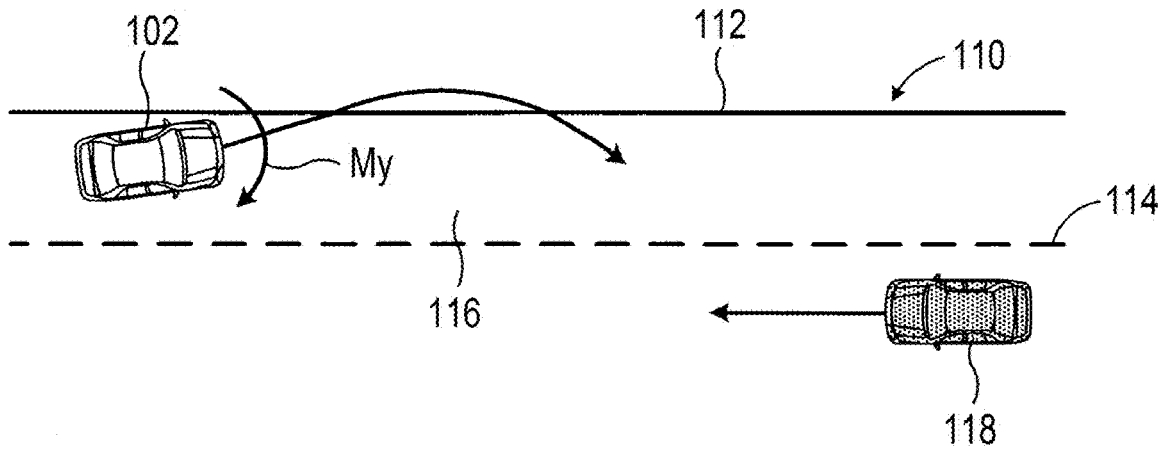
FIG. 4 is a diagram showing an operation of the embodiment in a case where a vehicle travels on a road for left-hand traffic, lane markings on both sides are detected, and a width is smaller than a reference value.
Figure 5:
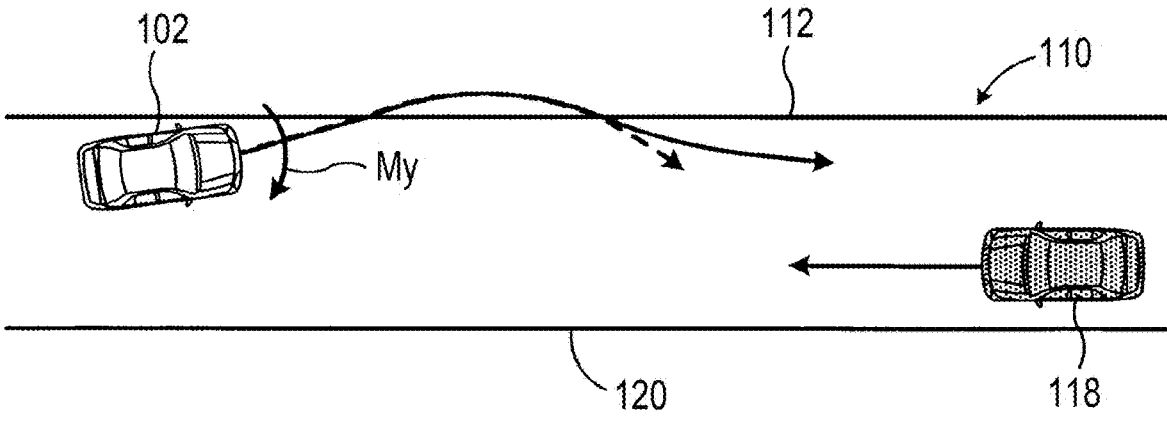
FIG. 5 is a diagram showing an operation of the embodiment in a case where the vehicle travels on a road for left-hand traffic and the lane markings on both sides are detected, but the width is equal to or greater than the reference value.
Figure 6:
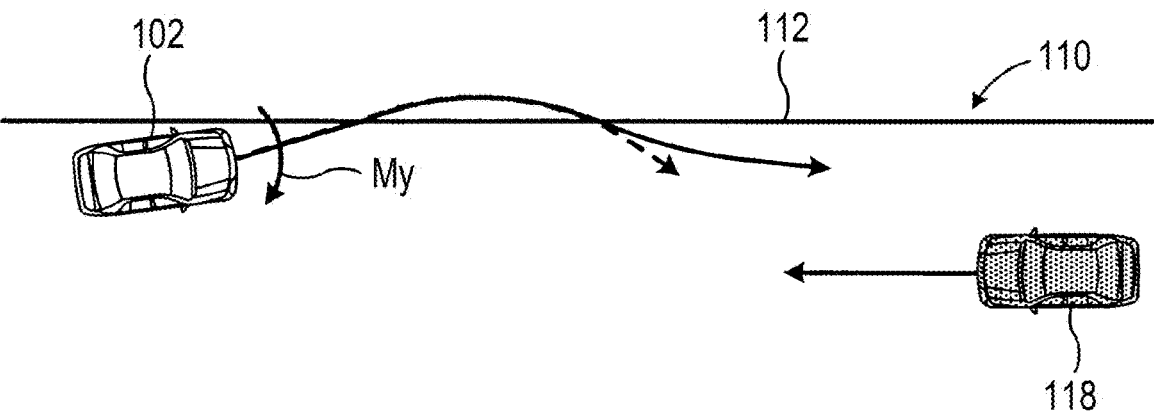
FIG. 6 is a diagram showing an operation of the embodiment in a case where the vehicle travels on a road for left-hand traffic and solely a lane marking on a left side is detected.

Next, an operation of the embodiment will be described with reference to FIGS. 4 to 6 for a case where the host vehicle 102 travels on a road for left-hand traffic in which a lane situation is different and there is a risk of the departure from the lane in an off-road direction. In FIGS. 4 to 6, 110 indicates a road on which the vehicle 102 travels, and 112 indicates a white line on a left side of the host vehicle 102. 114 indicates the center line, and 116 indicates a host vehicle lane between the white line 112 on the left side and the center line 114. Further, 118 indicates an oncoming vehicle that travels in a direction opposite to the host vehicle 102, and 120 indicates a white line on a left side of the oncoming vehicle.

C1: when Lane Markings on Both Sides are Detected and Width is Smaller than Reference Value (FIG. 4)

In this case, in steps S20, S30, an affirmative determination is made, and in step S50, the standard yaw moment application control is executed, so that the standard yaw moment Myn is applied to the vehicle 102. Therefore, the departure of the vehicle 102 from the lane can be more effectively suppressed than when the reduced yaw moment is applied to the vehicle (S70).

Since the center line 114 as a lane marking on a right side is also detected, even when there is a risk that the vehicle departs from the lane marking on the right side due to, for example, the standard yaw moment application control, the yaw moment application control of suppressing the departure is executed. Therefore, the vehicle is not likely to cross the lane marking on the right side or the occupant does not feel a sense of discomfort when the vehicle approaches the oncoming vehicle.

C2: When Lane Markings on Both Sides are Detected but Width is Equal to or Greater than Reference Value (FIG. 5)

In this case, there is a high possibility that the road on which the vehicle 102 travels is the road without the center line. An affirmative determination is made in step S20, but a negative determination is made in step S30. Therefore, in a case where there is no oncoming vehicle or the like, an affirmative determination is made in step S40, and thus the reduced yaw moment application control is executed in step S70 to apply the reduced yaw moment My to the vehicle 102.

Therefore, the suppression of the departure is executed more gently as compared with when the standard yaw moment Myn is applied to the vehicle (S50), and thus it is possible to suppress an excessive change in an orientation of the vehicle in a direction of the lane marking 114 on a side opposite to the departure side and an excessive yaw angle with respect to the lane. Therefore, a risk that the vehicle excessively approaches the lane marking on the right side or that the occupant of the vehicle feels a sense of discomfort when the vehicle excessively approaches the oncoming vehicle can be reduced as compared with when the yaw moment My is not reduced.

In particular, according to the embodiment, until the first predetermined time elapses from the start of the application the yaw moment, the yaw moment is the standard yaw moment, and until the first predetermined time has elapsed and then the second predetermined time has elapsed from the start of the application of the yaw moment, the yaw moment is gradually reduced. Further, the yaw moment My is the sum of the standard yaw moment Myn that is gradually reduced and the yaw moment Myr that is gradually increased in the direction opposite to the standard yaw moment, after the second predetermined time has elapsed.

Therefore, as shown by a solid line arrow in FIG. 5, in a situation where the suppression of the departure of the vehicle is completed by the yaw moment application control, an excessive change in the orientation of the vehicle in the direction of the lane marking 114 on the side opposite to the departure side can be prevented, and the yaw angle with respect to the lane can be gradually reduced.

C3: When Solely Lane Marking on Left Side is Detected (FIG. 6)

In this case, a negative determination is made in step S20, so that an affirmative determination is made in step S40 when there is no oncoming vehicle or the like. Therefore, as in a case of C2, in step S70, the reduced yaw moment application control is executed to apply the reduced yaw moment My to the vehicle 102.

Therefore, as shown by a solid line arrow in FIG. 6, as in a case of C2, in a situation where the suppression of the departure of the vehicle is completed, an excessive change in the orientation of the vehicle in a direction opposite to the departure direction can be prevented, and the yaw angle with respect to the lane can be gradually reduced.

In cases of C2, C3, in a case where there is no oncoming vehicle that travels in the direction opposite to the vehicle 102, a negative determination is made in step S40. Therefore, in the same manner as in a case of C1, the standard yaw moment application control is executed in step S50. Therefore, the departure of the vehicle 102 from the lane can be more effectively suppressed than when the reduced yaw moment is applied to the vehicle from the beginning of the application of the yaw moment (S70). In addition, since there is no oncoming vehicle or the like, the occupant of the vehicle does not feel a sense of discomfort when the vehicle approaches the oncoming vehicle or the like.

As can be seen from the above description, according to the present disclosure, when a determination is made that the vehicle 102 travels on the road 110 without the center line 114 and that there is a risk that the vehicle 102 departs from the lane 116 in the off-road direction (S10 to S30), the yaw moment My for suppressing the departure of the vehicle from the lane is reduced as compared with when a determination is made that the vehicle travels on the road with the center line and that there is a risk that the vehicle departs from the lane 116 in the off-road direction.

Therefore, the yaw moment to be applied to the vehicle is reduced, and thus a risk that the driver feels that control of turning the vehicle in a direction opposite toward a direction of the departure from the lane is excessive and feels insecure or inconvenient can be reduced as compared with a case where the yaw moment is not reduced. Even in a case where a determination is made that the vehicle travels on the road without the center line and that there is a risk that the vehicle departs from the lane in the off-road direction, the reduced yaw moment is applied to the vehicle, and thus the departure of the vehicle from the lane can be suppressed as compared with when the yaw moment is not applied.

When a determination is made that solely the information about the lane marking 112 on the side having a risk of the departure of the vehicle is acquired as the lane markings of the road 110 within the predetermined range from the vehicle 102 (S20), a determination is made that the road is the road without the center line (S70). Therefore, in a situation where solely the information about the lane marking on the side having a risk of the departure of the vehicle is acquired, the yaw moment to be applied to the vehicle is reduced. Therefore, a risk that the driver feels that control of turning the vehicle in a direction opposite toward a direction in which the vehicle departs from the lane is excessive and feels insecure or inconvenient can be reduced.

When a determination is made that the information about the lane markings 112, 114 on both sides of the vehicle is acquired as the lane markings of the road 110 and that the interval between the lane markings on both sides is equal to or greater than the reference interval (S20 and S30), the road is determined to be the road without the center line (S70). Therefore, when the road is the road without the center line, a determination thereof can be made.

Further, the yaw moment to be applied to the vehicle is not reduced until the predetermined time elapses from the start of the yaw moment application control (S72), and the yaw moment to be applied to the vehicle is gradually reduced after the predetermined time has elapsed from the start of the yaw moment application control (S74). Therefore, until the predetermined time elapses, the departure of the vehicle from the lane can be effectively suppressed. In addition, after the predetermined time has elapsed, the yaw moment is gradually reduced, and a risk that the driver feels that control of turning the vehicle toward a direction opposite to a direction of the departure from the lane is excessive and feels insecure or inconvenient can be reduced.

The present disclosure has been described in detail above with respect to a specific embodiment, but it is obvious to those skilled in the art that the present disclosure is not limited to the above-described embodiment, and various other embodiments are possible within the scope of the present disclosure.

For example, in the above-described embodiment, in step S40, a determination is made whether or not there is the oncoming vehicle that travels on the adjacent lane and approaches the vehicle 102 or another vehicle that travels on the host vehicle lane and tries to overtake the vehicle 102. However, step S40 may be omitted.

In the above-described embodiment, in step S70, until the first predetermined time elapses from the start of the application the yaw moment, the yaw moment is the standard yaw moment, and after the first predetermined time has elapsed from the start of the application of the yaw moment, the standard yaw moment is gradually reduced. However, the standard yaw moment may be gradually reduced from the start of the application of the yaw moment.

In the above-described embodiment, in step S70, when the second predetermined time has elapsed from the start of the application of the yaw moment, the gradual increase steering angle $\theta$tr in which a positive/negative sign is opposite to a positive/negative sign of the standard target steering angle $\theta$tn and the magnitude is gradually increased is calculated, and the target steering angle $\theta$t is set to the sum $\theta$tn+$\theta$tr of the standard target steering angle $\theta$tn and the gradual increase steering angle $\theta$tr. However, the calculation of the gradual increase steering angle $\theta$tr may be omitted, and the target steering angle $\theta$t may be set to solely the standard target steering angle $\theta$tn.

In the above-described embodiment, when an affirmative determination is made in step S30, the present control proceeds to step S50. However, when an affirmative determination is made in step S30, a determination may be made whether or not the vehicle traveling region is present on a side opposite to the vehicle 102 with respect to the white line on the right side, the present control may proceed to step S50 when an affirmative determination is made, and the present control may proceed to step S40 when a negative determination is made.

Further, in the above-described embodiment, the yaw moment My is applied by controlling the automatic steering device 46 to steer the steered wheels 44 such that the steering angle $\theta$ becomes the standard target steering angle $\theta$tn. However, at least a part of the yaw moment My may be generated by a difference in the brake/drive force between the right and left wheels.

What is claimed is:

1. A lane departure suppression device comprising:
   a target information acquisition device configured to acquire information about a target in a vicinity of a vehicle; and
   a control unit configured to, when a determination is made that there is a risk that the vehicle departs from a lane based on the information about the target acquired by the target information acquisition device, execute yaw moment application control of applying a yaw moment for suppressing the departure of the vehicle from the lane to the vehicle,
   wherein the control unit is configured to, when a determination is made that the vehicle travels on a road without a center line and that there is a risk that the vehicle departs from the lane in an off-road direction, reduce the yaw moment as compared with when a determination is made that the vehicle travels on a road with a center line and that there is a risk that the vehicle departs from the lane in the off-road direction.

2. The lane departure suppression device according to claim 1, wherein the control unit is configured to, when a determination is made that the target information acquisition device acquires solely information about a lane marking on a side having a risk of the departure of the vehicle as lane markings of the road within a predetermined range from the vehicle, determine that the road is the road without the center line.

3. The lane departure suppression device according to claim 1, wherein the control unit is configured to, when a determination is made that the target information acquisition device acquires information about lane markings on both sides of the vehicle as lane markings of the road within a predetermined range from the vehicle and that an interval between the lane markings on both sides is equal to or greater than a reference interval, determine that the road is the road without the center line.

4. The lane departure suppression device according to claim 1, wherein the control unit is configured to, after a predetermined time has elapsed from start of the yaw moment application control, gradually reduce the yaw moment to be applied to the vehicle.

5. A lane departure suppression method comprising:

determining whether or not there is a risk that a vehicle departs from a lane based on information about a target in a vicinity of the vehicle, the information being acquired by a target information acquisition device;

executing, when a determination is made that there is a risk that the vehicle departs from the lane, yaw moment application control of applying a yaw moment for suppressing the departure of the vehicle from the lane to the vehicle;

determining whether or not the vehicle is traveling on a road without a center line; and reducing, when a determination is made that the vehicle travels on the road without the center line and that there is a risk that the vehicle departs from the lane in an off-road direction, the yaw moment as compared with when a determination is made that the vehicle travels on a road with a center line and that there is a risk that the vehicle departs from the lane in the off-road direction.

* * * * *